United States Patent [19]

Sato

[11] Patent Number: 5,593,930
[45] Date of Patent: Jan. 14, 1997

[54] COMPOSITION FOR HIGH PRESSURE CASTING SLIP, HIGH PRESSURE CASTING SLIP AND METHOD FOR PREPARING THE COMPOSITION AND SLIP

[75] Inventor: Ritsu Sato, Iwakura, Japan

[73] Assignee: NGK Insulators, Ltd., Japan

[21] Appl. No.: 527,500

[22] Filed: Sep. 13, 1995

Related U.S. Application Data

[63] Continuation of Ser. No. 150,113, filed as PCT/JP93/00345, Mar. 24, 1993, abandoned.

[30] Foreign Application Priority Data

Mar. 26, 1992 [JP] Japan .................................. 4-067945

[51] Int. Cl.⁶ ............................ C04B 33/04; C04B 35/66
[52] U.S. Cl. ................... 501/141; 501/143; 501/144; 501/150; 501/153; 501/154; 501/94; 501/127; 501/133; 106/416; 106/486
[58] Field of Search ...................... 501/141, 143, 501/144, 145, 150, 153, 154, 94, 127, 133; 106/416, 486

[56] References Cited

U.S. PATENT DOCUMENTS

| | | | |
|---|---|---|---|
| 2,413,330 | 12/1946 | Miller | 501/145 |
| 3,257,218 | 6/1966 | Primak | 501/144 |
| 3,261,703 | 7/1966 | Hart et al. | 501/141 |
| 3,914,384 | 10/1975 | Gullett . | |
| 4,292,289 | 9/1981 | Cannon et al. . | |
| 4,476,187 | 10/1984 | Chang | 501/141 |
| 5,034,448 | 7/1991 | Koblinski et al. | 501/141 |
| 5,153,155 | 10/1992 | Kohut | 501/144 |

FOREIGN PATENT DOCUMENTS

| | | |
|---|---|---|
| 51-38299 | 3/1976 | Japan . |
| 52-32909 | 3/1977 | Japan . |
| 56-8210 | 1/1981 | Japan . |
| 56-44612 | 4/1981 | Japan . |
| 63-222062 | 9/1988 | Japan . |
| 1-255508 | 10/1989 | Japan . |
| 1270557 | 10/1989 | Japan . |
| 4-48604 | 8/1992 | Japan . |

*Primary Examiner*—Mark L. Bell
*Assistant Examiner*—Michael Marcheschi
*Attorney, Agent, or Firm*—Parkhurst, Wendel & Burr, L.L.P.

[57] ABSTRACT

An object of the present invention is to shorten the working time for high pressure slip casting. There is provided a composition for high pressure casting slip including a first starting powder forming a frame of a mold body and second starting powder forming the frame of the mold body and acting as a plastic agent, wherein the first and second starting powders are uniformly mixed in a dry condition. "Slip" of a minimum water content is easily prepared by the composition to effect optimal fluidity of the slip so that the water is removed from the slip in a short time during a casting process.

43 Claims, 7 Drawing Sheets

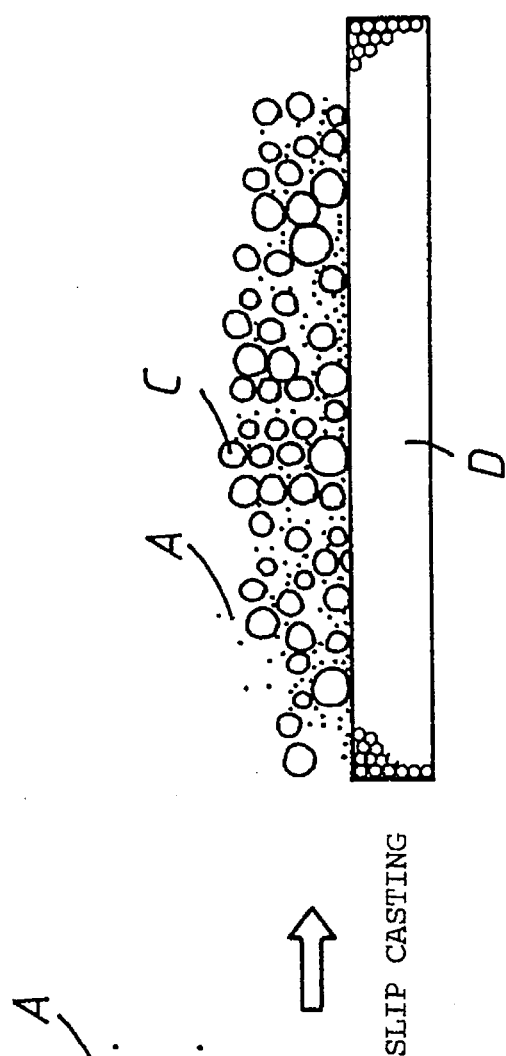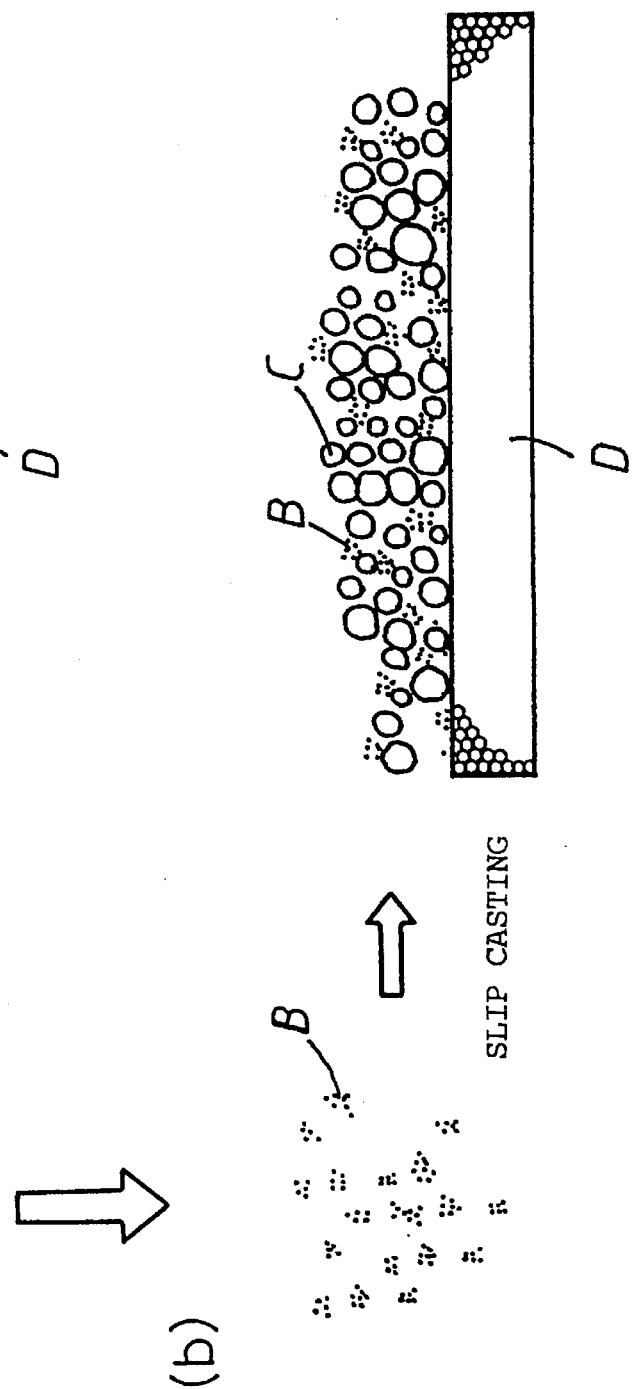
Fig. 5 (a)
Fig. 5 (b)

◇: NON-DRYING
△: DRYING TEMP. : 110°c
▲: DRYING TEMP. : 120°c
●: DRYING TEMP. : 200°c
◆: DRYING TEMP. : 300°c
▼: DRYING TEMP. : 400°c
□: DRYING TEMP. : 600°c

COMPOSITION FOR HIGH PRESSURE CASTING SLIP, HIGH PRESSURE CASTING SLIP AND METHOD FOR PREPARING THE COMPOSITION AND SLIP

This is a continuation of application Ser. No. 08/150,113, filed as PCT/JP93/00345 Mar. 24,1993, now abandoned.

BACKGROUND OF THE INVENTION

1. Field of the Invention

The present invention relates to a composition for high pressure casting slip, a high pressure casting slip prepared by the composition and a method of preparing the composition and slip.

2. Prior Art

In Japanese Patent Laid-open Publication No. 4-48604, there is disclosed a method of molding a ceramic article by slip-casting, wherein a suspension of casting slip under pressure is poured into a porous mold so that a difference in pressure between the interior and exterior of the mold causes water of the slip to discharge through the porous walls of the mold and solid matter in the slip is deposited on the internal walls of the mold and formed in a desired shape. The molding method is useful to form a ceramic article of complicated shape, and the cost of equipment for the molding method is inexpensive. For this reason, heretofore, the molding method has been adapted to form a mold body for tableware, flower vases, household potterys and the like. In the molding method, the casting slip is prepared from a first starting powder in the form of one or plural powder raw materials selected from the group consisting of feldsputhic material, silicate material, alumina material, porcelain stone, roseki and the like and second starting powder in the form of one or plural powder raw materials selected from the group consisting of Gairome silica sand, kaolin, Kibushi clay, burned clay and the like. The first starting powder is used to form the frame of the mold body, and the second starting powder is used to form the frame of the mold body and is adapted as a plastic agent.

The first and second starting powders are cast with water into a ball mill and ground in a wet condition. Simultaneously, the starting powder is mixed uniformly in the ball mill. To enhance the efficiency of grinding and mixing in a wet condition, it is required to apply an appropriate viscosity to the mixture in the ball mill. If the viscosity of the mixture is high in excess, it will become impossible to grind and mix the starting powder. If the viscosity of the mixture is low in excess, the grinding efficiency will noticeably decrease. In the grinding and mixing process, it is preferable that an amount of water in the mixture is, in general, in a range of 45 to 55% by weight. To effect optimal fluidity of the slip during the casting process, it is preferable that the water content of the slip is in a range of 30 to 40% by weight. In the case that the slip with such a water content is used for the slip casting, the water content of the finished mold body becomes about 20% by weight.

PROBLEM TO BE SOLVED

In application of the slip casting in industry, it is required to make the working time of slip casting as short as possible. Accordingly, it is required to shorten the time for preparation of the slip and for slip casting. However, in case the efficiency of wet grinding and mixing of the starting powder in the ball mill was enhanced, the water content of prepared slip would become 45-55% by weight, and the time for removing the water from the slip and for slip casting would be prolonged to obtain the finished mold body with the water content of about 20% by weight.

To overcome the foregoing problem, it is desirable that the slip prepared by wet mixing in the ball mill is heated to vaporize the water therefrom for adjusting the water content of the slip tube in the range of 30-40% by weight for effecting optimal fluidity of the slip during the casting process. This is effective to shorten the time for removing the water from the slip during the casting process. In such a case, however, an additional time is required for heating the slip, and the degree of vaporization of the water in the slip may not be uniformly controlled, resulting in irregular coagulation of fine powder particles in the slip. If the slip was used for the slip casting, sufficient strength of the mold body would not be obtained.

As another method for shortening the casting time, it has been proposed to carry out the slip casting under a high pressure as disclosed in the Laid-open Publication. However, even if only the casting pressure was increased, the casting time would not be adequately shortened.

SUMMARY OF THE INVENTION

It is, therefore, an object of the present invention to provide "slip" the water content of which can be easily adjusted to a minimum value for effecting optimum fluidity of the slip during the casting process thereby to remove the water from the "slip" under high casting pressure in a short time for shortening the casting time.

The present invention is concerned with a composition for high pressure casting slip, a high pressure casting slip and a method of preparing the composition and slip. The composition for high pressure casting slip according to the present invention consists essentially of a first starting powder forming the frame of a mold body and a second starting powder forming the frame of the mold body and acting as a plastic agent, wherein both the starting powders are uniformly mixed in a dry condition.

In the composition for high pressure casting slip, it is preferable that the average particle diameter of the second starting powder is equal to or smaller than that of the first starting powder, and it is also preferable that the whole second starting powder or a portion of the same is in the form of secondary particles formed by coagulation of primary particles and/or that the respective average particle diameter of the starting powder is in a range of 1–5 μm. In the composition for casting slip, it is further preferable that the first starting powder is in the form of one or plural powder raw materials selected from the group consisting of feldspathic material, silicate material, alumina material, porcelain stone and roseki, in the form of one or plural mineral composite powder raw materials selected from the group consisting of quartz, orthoclase, albite, anorthite, sericite and corundum or in the form of one or plural chemical composite powder raw materials selected from the group consisting of $Al_2O_3$; $SiO_2$; $Al_2O_3$ and $SiO_2$; $K_2O$, $Al_2O_3$ and $SiO_2$; $Na_2O$, $Al_2O_3$ and $SiO_2$; and $CaO$, $Al_2O_3$ and $SiO_2$. It is also preferable that the second starting powder is in the form of one or plural powder raw materials selected from the group consisting of Gairome clay, kaolin, Kibushi clay and burned clay or in the form of one or plural mineral composite powder raw materials selected from the group consisting of kaolinite, metahalloysite, pyrophyllite, montmorillonite, halloysite and dickite. In addition, the feldspathic material includes rocks consisting essentially of orthoclase, albite or anorthite, saba stone and the like. The alumina material includes bauxite, corundum bauxite and the like.

According to the present invention, the high pressure casting slip is prepared by the foregoing composition dispersed in an amount of water in such a manner that the water content of the slip becomes 25–40% by weight.

According to the present invention, the method of preparing the composition for high pressure casting slip is characterized in that the second starting powder is prepared by drying and grinding the second powder raw material or the mineral composite powder raw material and that the second starting powder is mixed with the first starting powder in a dry condition to obtain the composition for high pressure casting slip. In the preparation method, the second powder raw material or the mineral composite powder raw material is dried and ground at 120°–400° C. Alternatively, the second powder raw material or the mineral composite powder raw material is ground after being dried at 120°–400° C. In the preparation method, it is preferable that the first starting powder is prepared by dry grinding the first powder raw material, the mineral composite powder raw material or the chemical composite powder raw material or that the first powder raw material, the mineral composite powder raw material or the chemical composite powder raw material and the second powder raw material or the mineral composite powder raw material are ground at the same time in a dry condition. Alternatively, it is desirable that the first starting powder is prepared by wet grinding the first powder raw material, the mineral composite powder raw material or the chemical composite powder raw material.

According to the present invention, the method of preparing the slip is characterized in that the composition prepared by the foregoing method is added with a predetermined amount of water to obtain the slip of a predetermined water content or that the composition prepared by the foregoing method is mixed with diluted slip of the same composition to obtain the slip of a predetermined water content.

For preparation of high pressure casting slip, it has been understood that powder raw material can be efficiently and uniformly mixed by wet grinding in a grinding machine such as a ball mill. It has been, however, found that performance of a grinding machine and a mixing machine was enhanced in recent years to efficiently grind the raw materials of the first and second starting powder, the mineral composition, the chemical composition or the like in a dry condition and to uniformly mix the ground powder in a simple manner. The present invention was made by recognition of the above fact.

Accordingly, the composition for high pressure casting slip can be easily prepared by grinding of at least the second powder raw material and the mineral composite powder raw material in a dry condition and mixing the second starting powder with the first starting powder in a dry condition. In preparation of the high pressure casting slip using the composition, an amount of water added to the composition can be appropriately adjusted in a short time. Thus, it is able to prepare the slip with a minimum-water content capable of effecting optimal fluidity for the slip casting. Namely, the water content of the slip can be easily adjusted in a range of 25–40% by weight in a short time. As a result, it is able to minimize the amount of water to be absorbed in the slip casting for producing a mold body with water content of about 20% by weight. This is effective to shorten the slip casting time.

In comparison with slip the water content of which is minimized by vaporization of water for effecting optimal fluidity for slip casting, it is able to significantly shorten the preparation time of the slip and to make uniform the content of the slip for enhancing strength of the mold body.

In the composition for high pressure casting slip according to the present invention, the average particle diameter of the second starting powder is determined to be equal to or less than that of the first starting powder, and a portion of the second starting powder or the whole second starting powder is in the form of secondary particles formed by coagulation of primary particles of the powder. In the slip prepared by the composition, the particle diameter of the second starting powder is adjusted to be larger than the primary particles of the same. This is effective to restrain clogging of the porous walls of the mold during the slip casting and to ensure water permeability of solid matter deposited on the internal walls of the mold. As a result, water can be discharged from the slip in a short time for producing the mold body with the predetermined water content. This is useful to shorten the working time for slip casting.

The composition for casting slip can be easily prepared by drying and grinding the second powder raw material or the mineral composite powder raw material at a temperature of 120°–400° C. or grinding the second powder raw material or the mineral composite powder raw material after drying at a temperature of 120°–400° C. The primary particles of the second starting powder are in the form of fine particles the surfaces of which are covered with a water membrane of a predetermined thickness. When the second powder raw material or the mineral composite powder raw material is heated, the water on the particle surfaces is removed to decrease the thickness of the water membrane so that the primary particles of the powder raw material are coagulated into secondary particles the diameter of which is enlarged. If the heating temperature of the powder raw material is less than 120° C., the amount of water removed from the particle surfaces will decrease. In this case, the second starting powder is returned to the previous condition before heating when dispersed in water, and the particles of the second starting powder in the slip are returned to the same condition as the primary particles. If the heating temperature of the powder raw material is more than 400° C., the amount of water removed from the particle surfaces will increase. In this case, the plasticity of the second starting powder will be deteriorated to damage the property of the second starting powder.

BRIEF DESCRIPTION OF THE DRAWINGS

The present invention will be explained in more detail with reference to the appended drawings, in which

FIG. 5(a) and 5(b) are views illustrating variation of the slip casting characteristic of the "slip" in relation to the heating temperature of the second powder raw material;

DETAILED DESCRIPTION OF THE INVENTION

Process for Preparation of Slip

Figure 1:
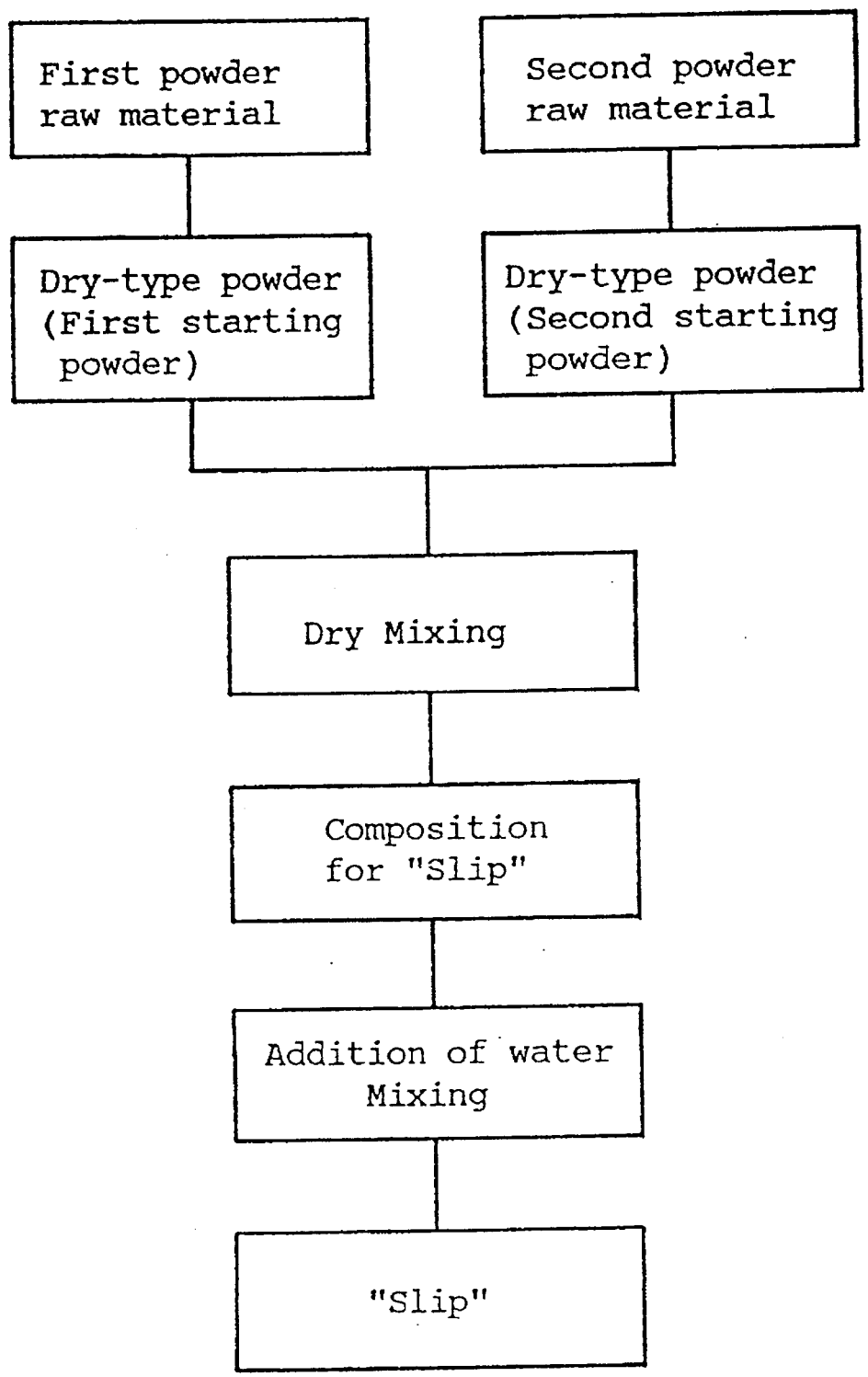
FIG. 1 is a view showing a preparation process of "slip" according to the present invention.

A process for preparation of "slip" according to the present invention is illustrated in FIG. 1. As shown in FIG. 1, one or plural powder raw materials selected from the group consisting of feldspathic material, silicate material, alumina material, porcelain stone and roseki is used for preparation of the first starting powder, and one or plural powder raw meterials selected from the group consisting of Gairome clay, kaolin, Kibushi clay and burned clay is used for preparation of the second starting powder. In the present invention, the raw material for the first starting powder may be replaced with one or plural mineral composite powder raw materials selected from the group consisting of quartz, orthoclase, albite, anorthite, sericite and corundum or one or plural chemical composite powder raw materials selected from the group consisting of $Al_2O_3$; $SiO_2$; $Al_2O_3$ and $SiO_2$; $K_2O$, $Al_2O_3$ and $SiO_2$; $Na_2O$, $Al_2O_3$ and $SiO_2$; and $CaO$, $Al_2O_3$ and $SiO_2$. The raw material of the second starting powder may be replaced with one or plural mineral composite powder raw materials selected from the group consisting of kaolinite, metahalloysite, pyrophyllite, montmorillonite, halloysite and dickite.

Figure 2:
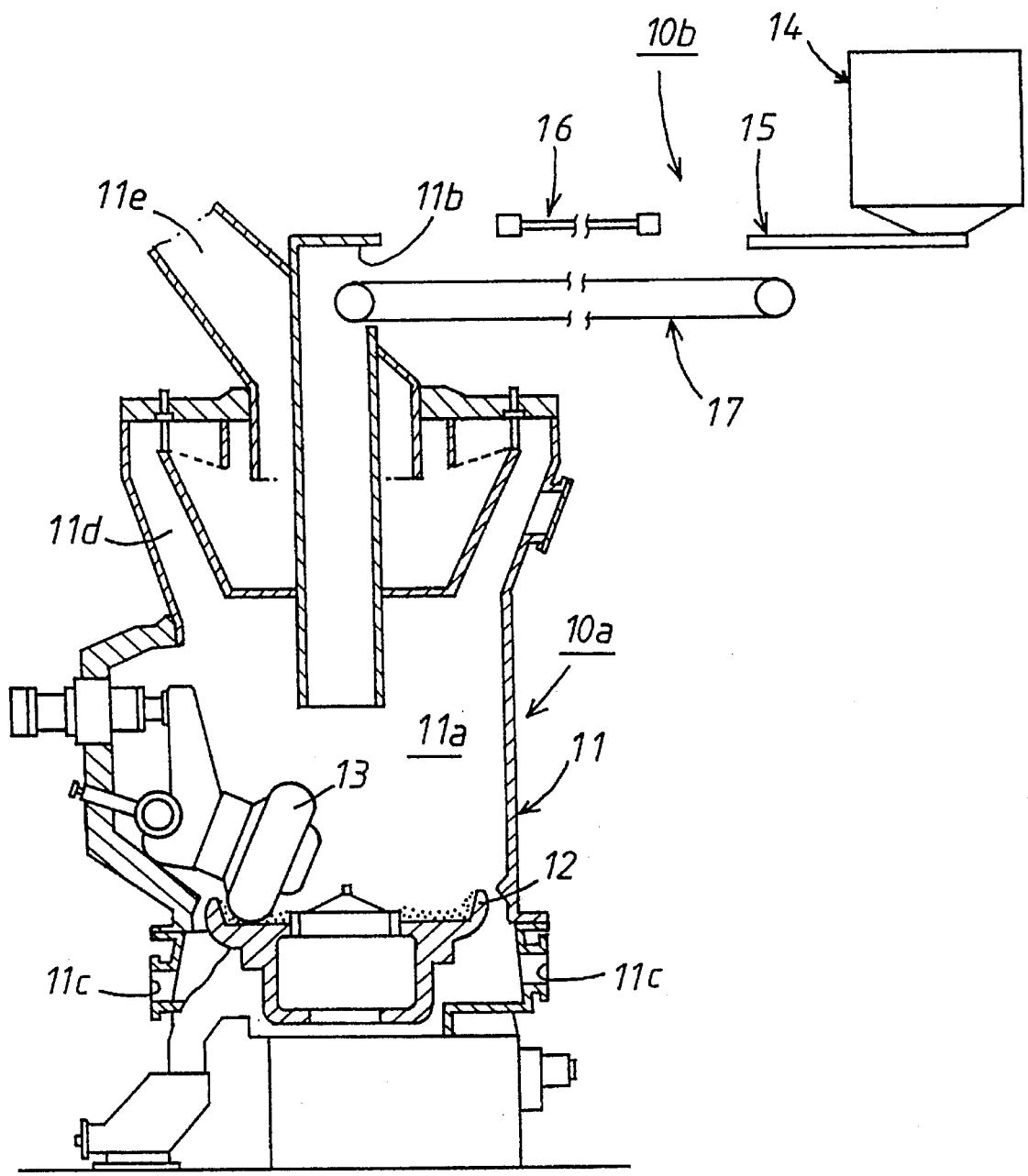
FIG. 2 is a vertical sectional view of a grinding machine suitable for grinding a second powder raw material.

The first powder raw material is ground in a dry condition using a roller mill, a Jet mill, a medium stirring mill or the like to produce a fine powder of 1–8 μm in average particle diameter. Since the second powder raw material contains water, it is dried by hot air and ground in a dry condition using a grinding machine to produce a fine powder of 1–5 μm in average particle diameter. In this case, the particle diameter of the second starting powder is determined to be equal to or smaller than that of the first starting powder. In addition, it is preferable that the heat drying temperature of the second starting powder is adjusted in a range of 120°–400° C. In FIG. 2 there is illustrated a grinding machine suitable for grinding the second starting powder.

If the heating temperature of the second starting powder is lower than 120° C., an amount of water removed from the surface of particles will decrease. When dispersed into water, the second starting powder is returned to the previous condition before the heating process, and the particle diameter of the second starting powder in "slip" becomes the same as that of the primary particle thereof before the heating process. If the heating temperature of the second starting powder exceeds 400° C. an amount of water removed from the surface of particles will gradually increase. This deteriorates plasticity of the second starting powder.

The first and second starting powders prepared by the foregoing processes are cast at a predetermined ratio into a dry-type mixing machine and uniformly mixed in a dry condition to prepare a composition for "slip". In this case, it is preferable that a mixing machine equipped with a high speed impeller is adapted as the dry-type mixing machine. For example, the composition for "slip" is prepared by mixing the first starting powder of 95–60% by weight with the second staring powder of 5–40% by weight.

For preparation of "slip" according to the present invention, the composition is added with a predetermined amount of water or diluted slip the water content of which is more than that of the "slip" used for casting. If necessary, a is peptization agent, coagulation agent or the like is added to the composition and is uniformly mixed therewith. In this case, it is preferable that the amount of water added to the composition is determined in accordance with the amount of the second starting powder to be as small as possible in a range for effecting optimal fluidity of the slip for high pressure casting. Preferably, the water content of the slip is determined to be 25–40% by weight. The prepared slip is used as a raw material for high pressure casting to form a ceramic mold body in a high pressure casting machine, for example, shown in FIG. 3.

Grinding Machine

As shown in FIG. 2, a conventional roller mill 10a is adapted to heat and grind the second starting powder consisting of clay in a dry condition. The roller mill 10a has a housing body 11 formed with a grinding chamber 11a, an annular rotary table 12 mounted on the bottom of grinding chamber 11a and a roller 13 mounted for rotation within the grinding chamber 11a to be driven on the rotary table 12. In the housing body 10a, the second starting powder is cast onto the rotary table 12 through an upper inlet opening 11b of the housing body, dried by hot air supplied from a lower opening 11c of the housing body and ground by the roller 13. The ground powder is blown up by an ascending current in the housing body 11 and supplied into a classification chamber 11d. Thus, only fine powder of less than a predetermined particle diameter is discharged from the classification chamber 11d through an outlet opening 11e of the housing body 11, while coarse powder of more than the predetermined particle diameter is returned onto the rotary table 12 in the grinding chamber 11a. Arranged above the roller mill 10a is a raw material supply device 10b for casting the second starting powder into the housing body 11. The raw material supply device 10b includes a hopper 14, a screw feeder 15, a heater 16 and a belt conveyor 17. The heater 16 and belt conveyer 17 are arranged within a drying furnace of the tunnel type (not shown). In the raw material supply device 10b, the second starting powder stored in hopper 14 is transported by the screw feeder 15 and supplied onto the belt conveyer 17. The second starting powder on belt conveyer 17 is dried by the heater 16 at 120°–400° C. during travel in the drying furnace. Thus, the second starting powder dried in a predetermined condition is cast into the housing body 11. In operation of the raw material supply device 10b, the housing body 11 may be supplied with the air at a normal temperature through the lower opening 11c.

High Pressure Casting Devices

Figure 3:
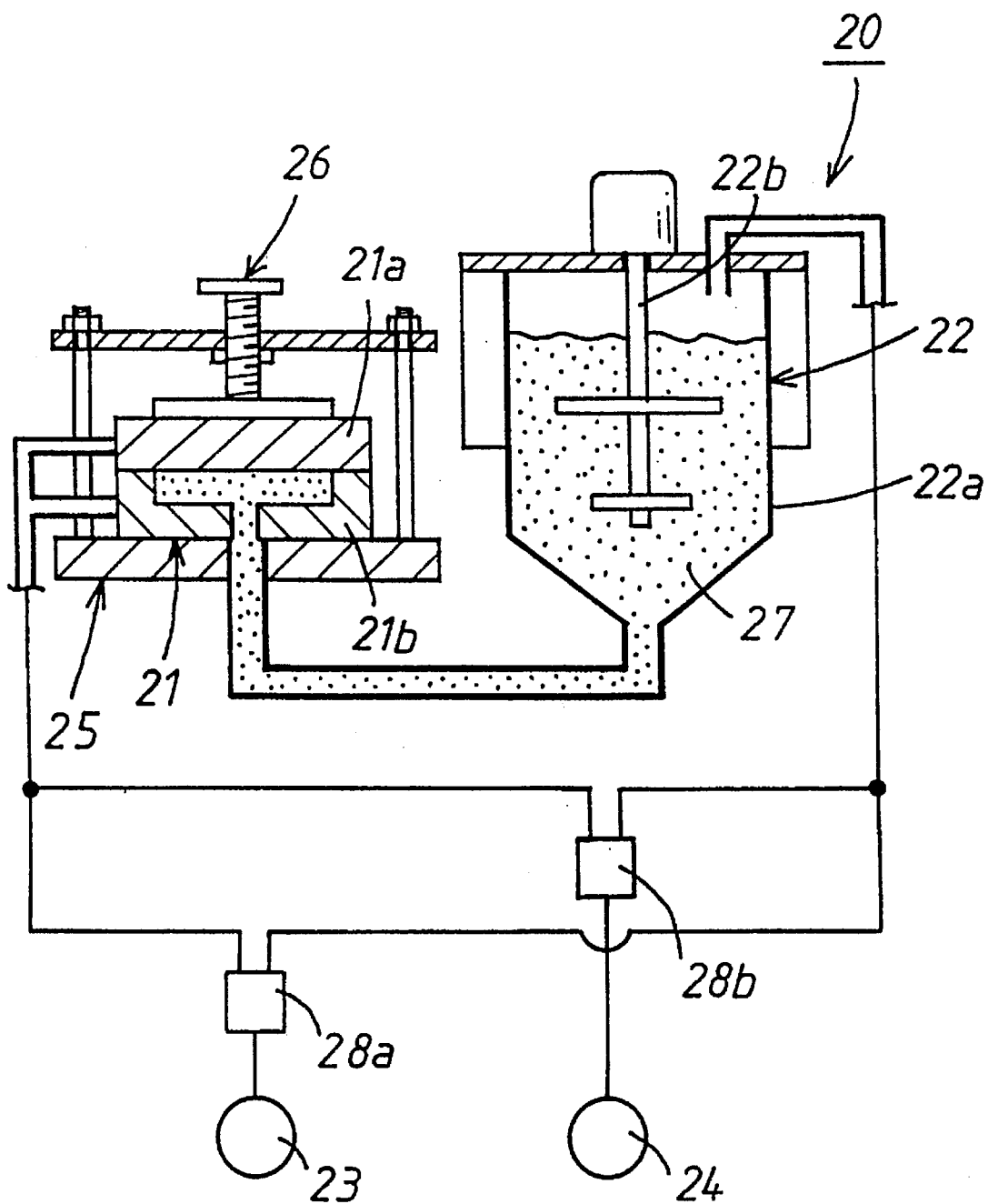
FIG. 3 is a vertical sectional view schematically illustrating a high pressure slip casting device suitable for molding the "slip" according to the present invention.

In FIG. 3, there is schematically illustrated a high pressure slip casting device 20 which is adapted to form a ceramic body using the "slip" according to the present invention. The casting device 20 is mainly composed of a casting mold 21, a storage tank 22, a decompression pump 23 and a compressor 24. The casting mold 21 is composed of a pair of upper and lower dies 21a, 21b which are made of porous material and coated with a sealing agent. The dies 21a, 21b are mounted on a base structure 25 to be opened and closed by a clampling machine 26. The casting mold 21 is connected to the decompression pump 23 and compressor 24 to be made in a negative or positive pressure condition by selective operation thereof.

The storage tank 22 is provided with an agitator 22b which is arranged to uniformly stir the slip 17 stored in the storage tank 22. The housing body 22a of storage tank 22 is connected at its bottom to the interior of casting mold 21 and at its upper portion to the decompression pump 23 and compressor 24. The slip in the housing body 22a is applied at its upper portion with a high pressure in operation of the compressor 24 and is depressurized by operation of the pump 23 to remove bubbles therefrom. In addition, the connecting conduits of the pump 23 and compressor 24 to the casting mold 21 and storage tank 22 are respectively provided with changeover valves 28a, 28b which are operated to selectively connect the pump 23 to the casting mold 21 or storage tank 22 and to selectively connect the compressor 24 to the casting mold 21 or storage tank 22.

In the casting device 20, the slip 27 under high pressure (10–40 kg/cm$^2$) in the storage tank 22 is supplied into the casting mold 21, while the interior of casting mold 21 is depressurized. In such a condition, the casting mold 21 absorbs water from the slip by a difference in pressure between the storage tank 22 and casting mold 21, whereby solid matter of the slip builds up as a deposit on the internal wall of casting mold 21 to form a mold body the water content of which is about 20% by weight. Thereafter, the pressure in casting mold 21 is made positive, and the casting mold 21 is opened to remove the mold body therefrom. The mold body is dried in necessity and is fired after steps of finishing and glazing to provide a ceramic article.

Experiment 1

In the high pressure casting device shown in FIG. 3, casting experiments have been conducted in various conditions using "slip" (Embodiments 1–16) prepared by the composition according to the present invention and "slip" (Comparative samples 1–9) prepared in a conventional manner. The "slip" used in the respective embodiments was prepared by a composition prepared by dry mixing of a first starting powder consisting of dry ground feldspar, silica stone and alumina and a second starting powder consisting of dry ground clay. In this case, the respective average particle diameter of the powder was determined in a range of 1.5–4.0 μm, the amount of the second starting powder relative to the whole amount of the composition was determined in a range of 5–40% by weight, and the water content of the "slip" was determined in a range of 25–40% by weight. The "slip" used in the comparative samples was prepared by wet grinding and wet mixing of the same raw materials as those in the embodiments. The average particle diameter of the raw material and the component and water content of the "slip" are substantially the same as those of the "slip" used in the embodiments. Provided that the water content of the "slip" used in the comparative samples was adjusted by heating the "slip".

In the experiments, the slip casting was carried out under a casting pressure of 30 kg/cm$^2$ to form a circular mold body of 100 mm in diameter, 20 mm in thickness and 20% by weight in water content. The strength of the mold body was measured by a three-point bending test, and the slip casting time was measured. The results of the experiments are indicated in the following Table 1, wherein the average particle diameter $D_{50}$ represents a particle diameter at a point of 50% by weight in particle size distribution.

TABLE 1

| Test No. | Average particle diameter $d_{50}$ (μm) | Second starting powder (wt %) | Water content (wt %) | Casting time (min) | Strength of Mold body (kg/cm$^2$) |
| --- | --- | --- | --- | --- | --- |
| Emb. | | | | | |
| 1 | 1.5 | 5 | 28 | 4.0 | 32 |
| 2 | 1.5 | 20 | 33 | 9.4 | 35 |
| 3 | 1.5 | 20 | 39 | 11.1 | 37 |
| 4 | 1.5 | 40 | 35 | 14.1 | 41 |
| 5 | 1.5 | 40 | 39 | 15.8 | 43 |
| 6 | 2.5 | 5 | 27 | 2.3 | 33 |
| 7 | 2.5 | 10 | 33 | 4.0 | 35 |
| 8 | 2.5 | 10 | 37 | 4.5 | 35 |
| 9 | 2.5 | 40 | 32 | 7.8 | 37 |
| 10 | 2.5 | 40 | 37 | 9.0 | 40 |
| 11 | 3.0 | 5 | 25 | 1.8 | 30 |
| 12 | 3.0 | 5 | 32 | 2.3 | 34 |
| 13 | 3.0 | 10 | 32 | 3.2 | 36 |
| 14 | 3.0 | 40 | 37 | 7.5 | 42 |
| 15 | 4.0 | 10 | 24 | 1.8 | 35 |
| 16 | 4.0 | 10 | 27 | 2.0 | 32 |
| Com. | | | | | |
| 1 | 1.6 | 5 | 30 | 6.2 | 26 |
| 2 | 1.6 | 20 | 39 | 16.1 | 30 |
| 3 | 1.6 | 40 | 39 | 22.8 | 34 |
| 4 | 2.5 | 5 | 29 | 3.8 | 24 |
| 5 | 2.5 | 10 | 33 | 6.2 | 25 |
| 6 | 2.5 | 40 | 37 | 13.8 | 28 |
| 7 | 3.0 | 5 | 32 | 3.5 | 23 |
| 8 | 3.0 | 10 | 32 | 5.0 | 26 |
| 9 | 3.0 | 40 | 37 | 11.5 | 27 |

In the foregoing embodiments, the slip casting time was shortened since the "slip" was prepared by the composition in a dry condition for adjusting the water content of the slip to a minimum amount for providing fluidity required in the slip casting. In the embodiments, it has been found that the strength of the mold body was increased in contrast with the comparative samples the water content of which was adjusted by vaporization caused by heating. In the comparative samples, vaporization of the water becomes irregular in the surface and interior of the slip, resulting in variation in a coagulated condition of fine particles of the powder. Due to variation of the fine particles, the slip casting time of the comparative samples was greatly different from that of the embodiments, as shown in Table 1. Since the water content of the slip in the comparative samples was adjusted by heating, a long time was spent for preparation of the slip. For this point of view, the working time for the slip casting in the comparative samples may not be shortened.

Although in the foregoing embodiments an amount of water was added to the composition for preparation of the "slip", diluted slip may be substituted for the water for adjusting the water content of the slip.

Experiment 2

In the high pressure slip casting device shown in FIG. 3, slip casting experiments were carried out using "slip" (Embodiments 1–9) prepared by the composition according to the present invention, "slip" (Comparative samples 3 and 5) prepared in a conventional manner and "slip" (Comparative samples 1, 2, 4 and 6) prepared by a composition different from the composition according to the present invention. The "slip" used in the respective embodiments was prepared by a composition prepared by dry mixing of first starting powder consisting of dry ground feldspar, silica stone and alumina and second starting powder consisting of dry ground clay. In this case, the raw material of the second starting powder was preliminarily heated and dried at 120°–300° C. In the comparative samples 1, 2, 4 and 6, the raw material of the second starting powder was heated and dried at a temperature out of 120°–300° C. In the respective slip, the average particle diameter of the powder was determined in a range of 1.5–4.0 μm, the amount of the second starting powder relative to the whole amount of the composition was determined in a range of 5–40% by weight, and the water content of the slip was determined in a range of 25–40% by weight. The slip used in the comparative samples 3 and 5 was prepared by wet grinding and mixing of both the raw materials. The average particle diameter of both the powder and the component and water content of the slip were determined to be substantially the same as those in the embodiments. Provided that the water content of the slip used in the comparative samples was adjusted by heating the slip.

Figure 4:
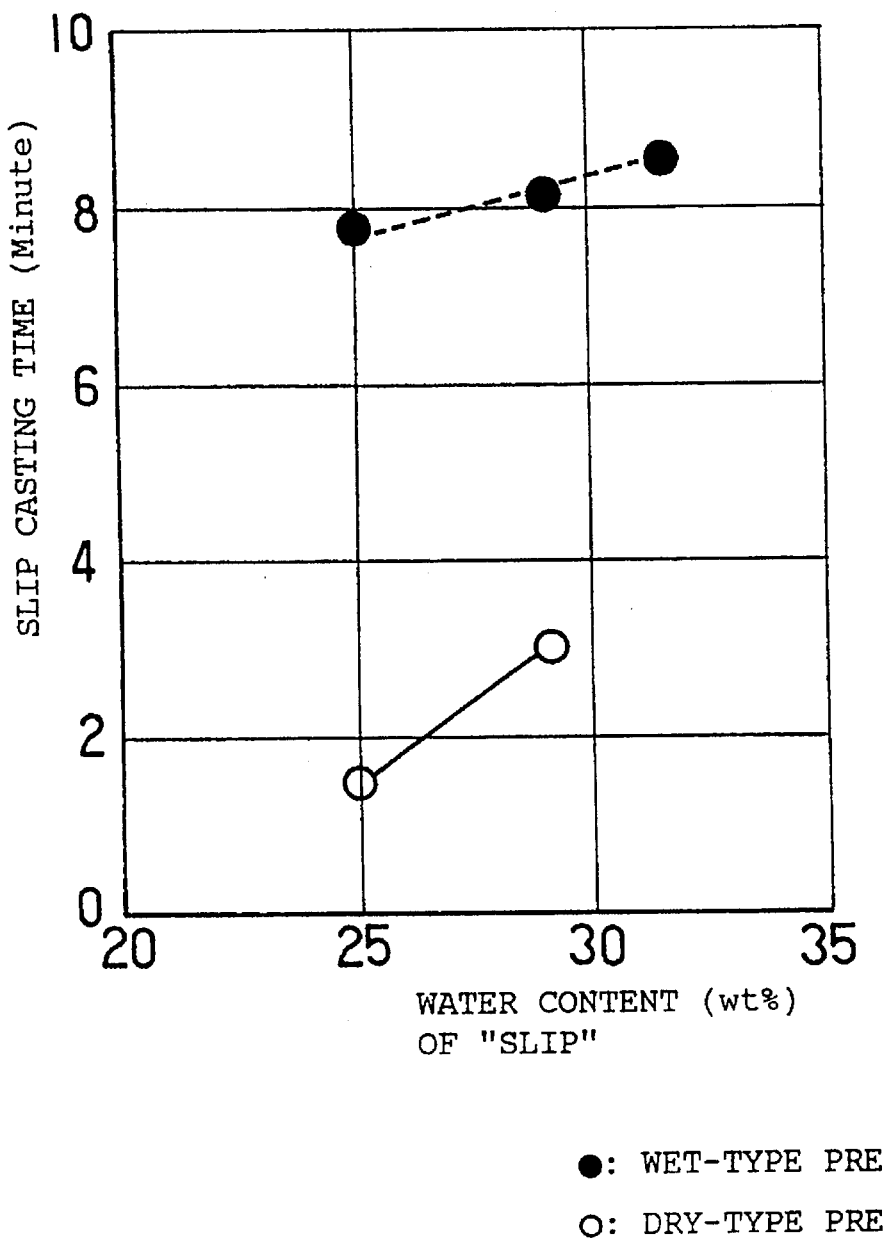
FIG. 4 is a graph showing a relationship between the water content of the "slip" and the slip casting time.

In the experiments, the slip casting was carried out under a casting pressure of 20 kg/cm² to form a circular mold body of 130 mm in diameter, 30 mm in thickness and 20% by weight in water content. The casting time in the slip casting was measured, and the results of the measurement are listed in the following Table 2. Additionally, the slip casting time was measured in relation to the respective water content of the slip prepared by the dry type composition (the heating temperature of the second starting powder: 120° C.) and the slip prepared by the wet type composition, and the result of the measurement is shown in FIG. 4. In this case, the condition for preparation of the slip, the characteristic of the slip and the condition for slip casting were determined as described below:

Slip composition: feldspar 30 wt. %, silica sand 10 wt. %, aluminium Oxide 20 wt. %, Gairome clay 40 wt. %

Particle diameter of slip: 3 μm

Slip casting pressure: 40 kg/cm²

TABLE 2

| Test No. | Heat drying temp. (°C.) | Second starting powder (wt %) | Water content (wt %) | Casting time (min) |
| --- | --- | --- | --- | --- |
| Emb. | | | | |
| 1 | 120 | 5 | 29 | 2.4 |
| 2 | 200 | 5 | 30 | 1.4 |
| 3 | 300 | 5 | 30 | 2.3 |
| 4 | 120 | 10 | 29 | 2.5 |
| 5 | 200 | 10 | 30 | 1.5 |
| 6 | 300 | 10 | 30 | 2.5 |
| 7 | 120 | 40 | 29 | 2.8 |
| 8 | 200 | 40 | 30 | 1.7 |
| 9 | 300 | 40 | 30 | 2.7 |
| Com. | | | | |
| 1 | 110 | 5 | 29 | 3.2 |
| 2 | 600 | 5 | 30 | 4.3 |
| 3 | Non dry | 10 | 32 | 3.6 |
| 4 | 110 | 10 | 29 | 3.4 |
| 5 | Non dry | 40 | 32 | 3.6 |
| 6 | 600 | 40 | 30 | 4.8 |

In the foregoing embodiments 1–9 where the slip was prepared by the composition according to the present invention, the slip casting time was shortened since the water content of the slip could be easily adjusted to a minimum amount for providing fluidity required for the slip casting. In the embodiments, the raw material of the second starting powder was heated and dried at a proper temperature for preparation of the composition. As a result, the characteristic of the slip in the casting process was greatly influenced by heating and drying of the slip, and the slip casting time was greatly shortened in contrast with the comparative samples for the following reasons.

In the case that the raw material of the second starting powder was heated and dried at a temperature of 120°–300° C., the fine particles of the second starting powder are coagulated so that primary particles A shown in FIG. 5(a) becomes secondary particles B of suitable size shown in FIG. 5(b). The secondary particles B are uniformly mixed with fine particles C of the first starting powder in the slip and retained in an appropriate particle size. Thus, in comparison with the slip where the second starting powder is present in the form of the primary particles, the loading of the mold for slip casting is restrained to enhance water permeability of the solid matter deposited on the mold. This is effective to shorten the slip casting time.

In the case that the second starting powder was heated and dried at a temperature out of the foregoing range, the above-described result may not be obtained. If the heat drying temperature is less than 120° C., the secondary particles formed by heating and drying becomes the primary particles when dispersed in water during preparation of the slip. This reduces the effect for shortening the slip casting time. If the heat drying temperature is more than 300° C., the characteristic of the clay is damaged to deteriorate the plasticity of the slip, resulting in decrease of the strength of the mold body.

Experiment 3

Figure 6:
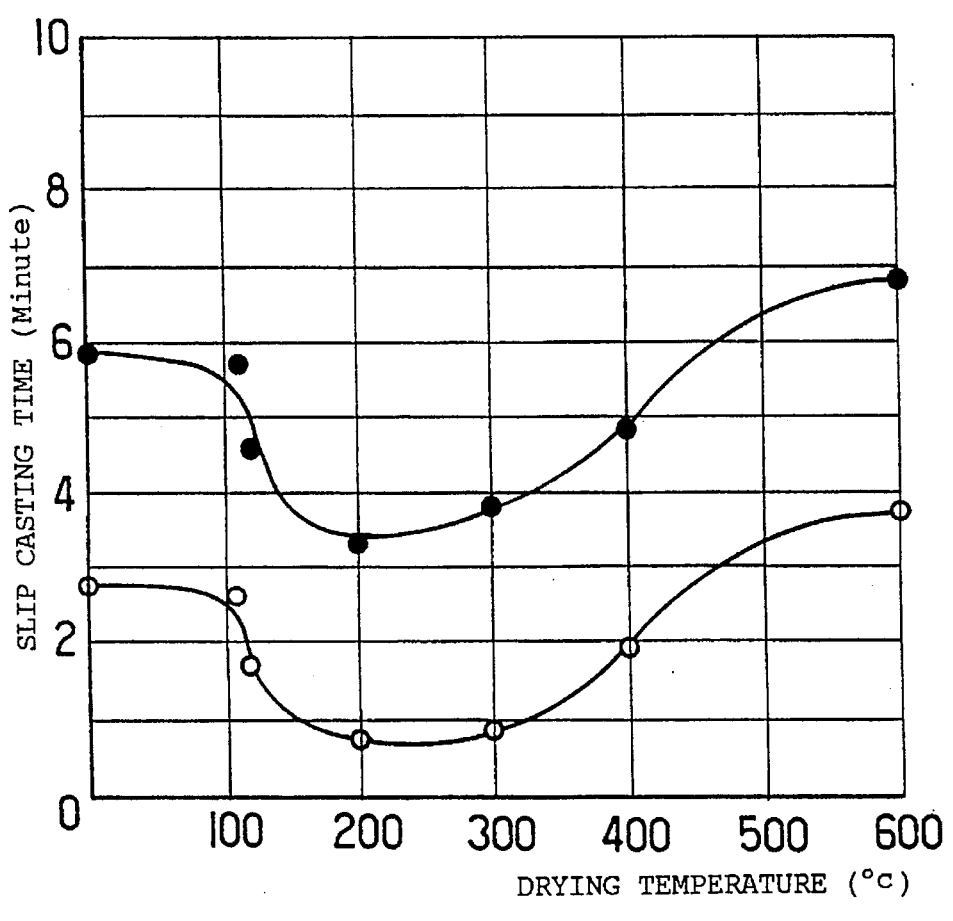
FIG. 6 is a graph showing a relationship between the drying temperature of the second powder raw material and the slip casting time.
Figure 7:
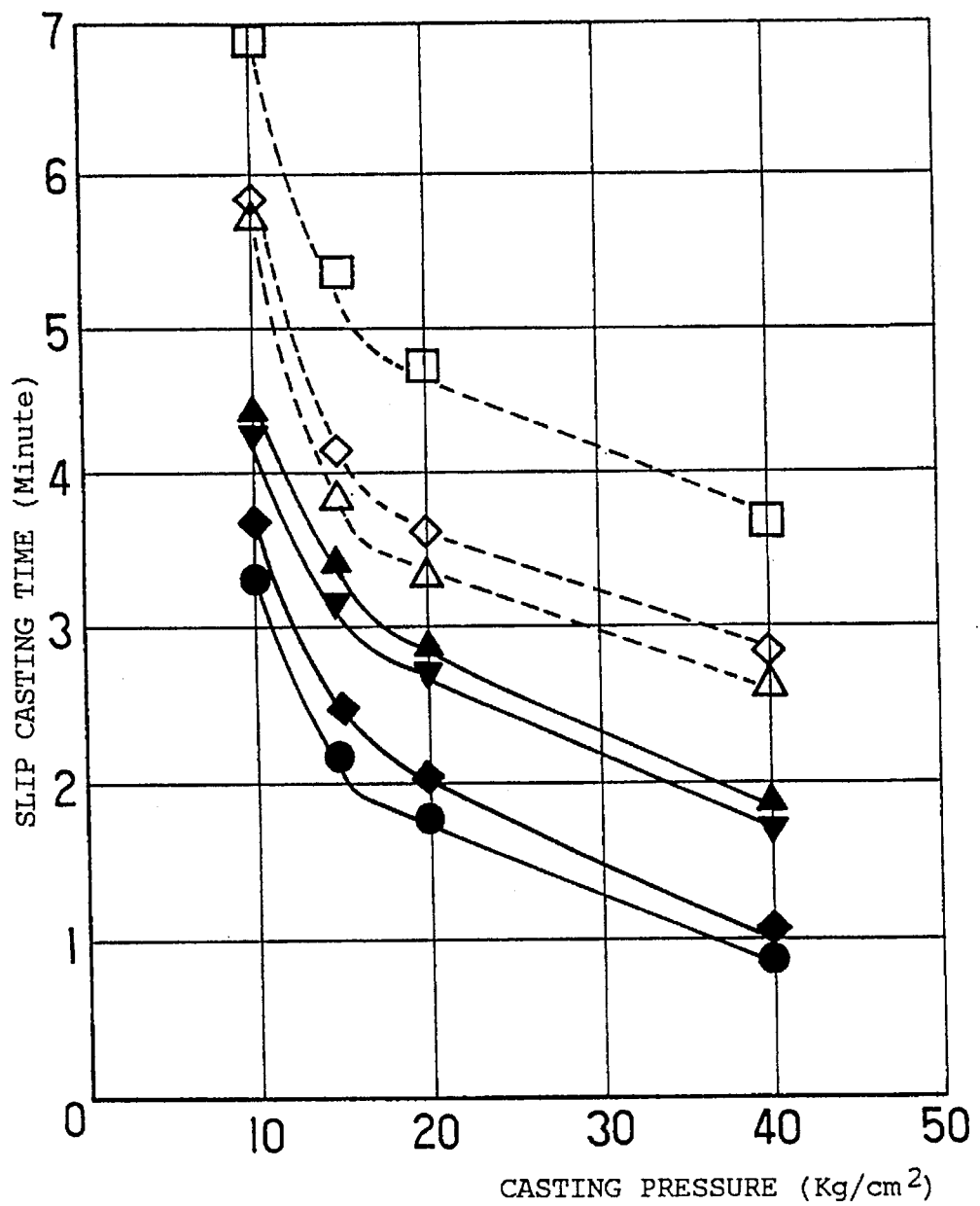
FIG. 7 is a graph showing a relationship between the casting pressure and the slip casting time.

Based on the foregoing recognition, an experiment was conducted to clarify a relationship between the temperature for heating and drying and the slip casting time of the raw material of the second starting powder in the form of clay. In this experiment, the same condition as the Experiment 2 was adapted except for the temperature for heating and drying and the slip casting condition. The result of the experiment is shown in FIGS. 6 and 7. In FIG. 6, there is illustrated a relationship between the temperature for heating and drying and the slip casting time under the casting pressure of 10 kg/cm², 40 kg/cm². In FIG. 7, there is illustrated a relationship between the casting pressure and the slip casting time under various temperature for heating and drying. In the graph of FIG. 6, the slip casting time related to 0° C. represents the casting time of the slip prepared in a wet condition without heating and drying the raw material of the second starting powder.

As clearly understood from the respective graphs of FIGS. 6 and 7, the slip casting time is significantly shortened in the case that the second starting powder was heated and dried at a temperature of 120°–400° C. in comparison with the case where the slip was prepared in the conventional manner or the second starting powder was heated and dried at a temperature out of 120°–400° C. In this case, it is apparent that the slip casting time becomes shortest when the heat drying temperature of the second starting powder is determined to be about 200° C.

Experiment 4

Based on the foregoing recognition, an experiment was conducted to demonstrate a relationship among the heating temperature of the second starting powder, the average particle diameter of the second starting powder, the water content of the slip, the slip casting time and the molding property. In this experiment, a mold body of 130 mm in diameter, 30 mm in thickness and 20 wt. % in water content was formed under slip casting pressure of 20 kg/cm². The results of the experiment are shown in Tables 3–5.

TABLE 3

| Test No. | Particle diameter of 1st powder (μm) | Particle diameter of 2nd powder (μm) | Heat drying temp. (°C.) | Water content (wt %) | Casting time (min) | Molding property (good/whole) |
| --- | --- | --- | --- | --- | --- | --- |
| Emb. | | | | | | |
| 1 | 3.2 | 1.0 | 120 | 28 | 3.3 | 20/20 |
| 2 | 2.1 | 2.2 | 200 | 31 | 1.4 | 20/20 |
| 3 | 3.2 | 2.2 | 200 | 29 | 1.2 | 20/20 |
| 4 | 4.5 | 2.2 | 200 | 27 | 0.8 | 19/20 |
| 5 | 3.2 | 2.4 | 300 | 26 | 2.7 | 20/20 |
| 6 | 3.2 | 3.3 | 300 | 25 | 2.5 | 20/20 |
| 7 | 3.2 | 5.0 | 300 | 25 | 2.2 | 19/20 |
| Com. | | | | | | |
| 1 | 3.2 | 0.3 | 110 | 44 | 22.5 | 20/20 |
| 2 | 3.2 | 0.8 | 110 | 42 | 17.6 | 17/20 |
| 3 | 3.2 | 6.0 | 600 | 24 | 8.8 | 5/20 |

In Table 3, the ratio of the second starting powder to the first starting powder is 5/59 by weight, the molding property represents the number of good pieces in the whole mold bodies, and the particle diameter of the respective powder is $d_{50}$: μm.

TABLE 4

| Test No. | Particle diameter 1st powder (μm) | Particle diameter of 2nd powder (μm) | Heat drying temp. (°C.) | Water content (wt %) | Casting time (min) | Molding property (good/whole) |
| --- | --- | --- | --- | --- | --- | --- |
| Emb. | | | | | | |
| 8 | 3.2 | 1.2 | 120 | 32 | 3.6 | 20/20 |
| 9 | 2.1 | 2.2 | 200 | 33 | 1.8 | 20/20 |
| 10 | 3.2 | 2.2 | 200 | 31 | 1.4 | 20/20 |
| 11 | 4.5 | 2.2 | 200 | 29 | 1.0 | 19/20 |
| 12 | 3.2 | 2.4 | 300 | 28 | 2.3 | 20/20 |
| 13 | 3.2 | 3.3 | 300 | 27 | 1.7 | 20/20 |
| 14 | 3.2 | 5.0 | 300 | 25 | 1.6 | 20/20 |
| Com. | | | | | | |
| 4 | 3.2 | 0.8 | 110 | 43 | 25.8 | 18/20 |
| 5 | 3.2 | 6.0 | 600 | 28 | 10.2 | 7/20 |

In Table 4, the ratio of the second starting powder to the first starting powder is 10/90 by weight, the molding property represents the number of good pieces in the whole mold bodies, and the particle diameter of the respective powder is $d_{50}$: μm.

TABLE 5

| Test No. | Particle diameter of 1st powder (μm) | Particle diameter of 2nd powder (μm) | Heat drying temp. (°C.) | Water content (wt %) | Casting time (min) | Molding property (good/whole) |
| --- | --- | --- | --- | --- | --- | --- |
| Emb. | | | | | | |
| 15 | 3.2 | 1.0 | 120 | 40 | 4.9 | 20/20 |
| 16 | 3.2 | 2.2 | 200 | 36 | 3.4 | 20/20 |
| 17 | 3.2 | 3.3 | 300 | 29 | 3.8 | 20/20 |
| Com. | | | | | | |
| 6 | 3.2 | 0.8 | 110 | 51 | 46.1 | 19/20 |
| 7 | 3.2 | 6.0 | 600 | 31 | 13.1 | 11/20 |

In Table 5, the ratio of the second starting powder to the first starting powder is 40/60 by weight, the molding property represents the number of good pieces in the whole mold bodies, and the particle diameter of the respective powder is $d_{50}$: μm.

As is understood from Tables 3 to 5, the slip casting time was shortened and the molding property was improved in the case that the average diameter of secondary particles of the second starting powder was determined in a range of 1.0–5.0 μm and that the water content of the slip was determined to be 20–40% by weight. In the case that the average particle diameter of the second starting powder was determined to be less than 1.0 μm, the viscosity of the slip became high. It was, therefore, required to increase the water content of the slip for effecting optimal fluidity of the slip during the slip casting process. If the slip was used, the mold would be clogged in a short time to deteriorate the water permeability of solid matter deposited on the mold. As a result, it is unable to shorten the slip casting time. Although the slip casting time is shortened in the case that the average particle diameter of the second starting powder is determined to be more than 5.0 μm, deviation in a mixed condition will occur in the mold body due to large particles of the powder, and the molding property will be deteriorated, resulting in an increase of the damage rate in firing.

The second starting powder can be prepared by heat drying the second powder raw material at a temperature of 120°–400° C. and grinding the same or grinding the second powder raw material after heat drying. The slip can be prepared by using the second starting powder described above. In the case that the heating temperature of the second powder raw material is determined to be lower than 120° C., secondary particles may not be formed since water film adhered to the particles of the second starting powder becomes thick. It is, therefore, difficult to prepare the second starting powder in average particle diameter less that 1.0 μm. In the case that the heating temperature of the second powder raw material is determined to be higher than 400° C., the particles of the second starting powder are varied in their properties to gradually eliminate plasticity of the powder, resulting in deterioration of the molding property.

I claim:

1. A method of preparing a pressure casting slip, comprising the steps of:

uniformly dry mixing a first starting powder and a second starting powder, wherein the first starting powder forms a frame of a mold body, and the second starting powder forms a frame of the mold body and acts as a plastic agent, said second starting powder being prepared by drying at a temperature of 120°–400° C.;

producing a diluted slip having the same composition as that of the first and second starting powders; and mixing the first and second starting powders with the diluted slip to produce a high pressure casting slip having 25–40 wt. % by weight water.

2. A pressure casting slip exhibiting reduced casting time, consisting essentially of:

a first starting powder forming a frame of a mold body and a second starting powder forming a frame of the mold body and acting as a plastic agent, said first starting powder being in the form of at least one powder raw material comprising feldspathic material, silicate material, alumina material, porcelain stone or roseki, said second starting powder being in the form of at least one powder raw material comprising Gairome clay, kaolin, Kibushi clay or burned clay, wherein the first and second starting powders are prepared by drying the second starting powder at a temperature of 120°–400° C. and then uniformly mixing the second starting powder with the first starting powder in a dry condition; and 25–40 wt. % water.

3. The pressure casting slip of claim 2, wherein an average particle diameter of the second starting powder is equal to or less than that of the first starting powder, and wherein at least a portion of the second starting powder is in the form of secondary particles formed by coagulation of primary particles of the second starting powder when dried.

4. The pressure casting slip of claim 2, wherein an average particle diameter of the second starting powder is in a range of 1–5 microns.

5. The pressure casting slip of claim 2, wherein the second starting powder is ground after being dried at 120°–400° C. and is then mixed with the first starting powder in a dry condition.

6. The pressure casting slip of claim 5, wherein the first starting powder is ground in a dry condition before being mixed with the second starting powder.

7. The pressure casting slip of claim 5, wherein the first starting powder and the second starting powder are ground at the same time in a dry condition.

8. The pressure casting slip of claim 5, wherein the first starting powder is ground in a wet condition and dried before being mixed with the second starting powder.

9. A pressure casting slip exhibiting reduced casting time, consisting essentially of:

a first starting powder forming a frame of a mold body and a second starting powder forming a frame of the mold body and acting as a plastic agent, said first starting powder being in the form of at least one powder raw material comprising feldspathic material, silicate material, alumina material, porcelain stone or roseki, said second starting powder being in the form of at least one mineral composite powder raw material comprising kaolinite, metahalloysite, pyrophyllite, montmorillonite, halloysite or dickite, wherein the first and second starting powders are prepared by drying the second starting powder at a temperature of 120°–400° C. and then uniformly mixing the second starting powder with the first starting powder in a dry condition; and 25–40 wt. % water.

10. The pressure casting slip of claim 9, wherein an average particle diameter of the second starting powder is equal to or less than that of the first starting powder, and wherein at least a portion of the second starting powder is in the form of secondary particles formed by coagulation of primary particles of the second starting powder when dried.

11. The pressure casting slip of claim 9, wherein an average particle diameter of the second starting powder is in a range of 1–5 microns.

12. The pressure casting slip of claim 9, wherein the second starting powder is ground after being dried at 120°–400° C. and is then mixed with the first starting powder in a dry condition.

13. The pressure casting slip of claim 12, wherein the first starting powder is ground in a dry condition before being mixed with the second starting powder.

14. The pressure casting slip of claim 12, wherein the first starting powder and the second starting powder are ground at the same time in a dry condition.

15. The pressure casting slip of claim 12, wherein the first starting powder is ground in a wet condition and dried before being mixed with the second starting powder.

16. A pressure casting slip exhibiting reduced casting time, consisting essentially of:

a first starting powder forming a frame of a mold body and a second starting powder forming a frame of the mold body and acting as a plastic agent, said first starting powder being in the form of at least one powder raw material comprising quartz, orthoclase, albite, anorthite, sericite or corundum, said second starting powder being in the form of at least one powder raw material comprising of Gairome clay, kaolin, Kibushi clay or burned clay, wherein the first and second starting powders are prepared by drying the second starting powder at a temperature of 120°–400° C. and then uniformly mixing the second starting powder with the first starting powder in a dry condition; and 25–40 wt. % water.

17. The pressure casting slip of claim 16, wherein an average particle diameter of the second starting powder is equal to or less than that of the first starting powder, and wherein at least a portion of the second starting powder is in the form of secondary particles formed by coagulation of primary particles of the second starting powder when dried.

18. The pressure casting slip of claim 16, wherein an average particle diameter of the second starting powder is in a range of 1–5 microns.

19. The pressure casting slip of claim 16, wherein the second starting powder is ground after being dried at 120°–400° C. and is then mixed with the first starting powder in a dry condition.

20. The pressure casting slip of claim 19, wherein the first starting powder is ground in a dry condition before being mixed with the second starting powder.

21. The pressure casting slip of claim 19, wherein the first starting powder and the second starting powder are ground at the same time in a dry condition.

22. The pressure casting slip of claim 19, wherein the first starting powder is ground in a wet condition and dried before being mixed with the second starting powder.

23. A pressure casting slip exhibiting reduced casting time, consisting essentially of:

a first starting powder forming a frame of a mold body and a second starting powder forming a frame of the mold body and acting as a plastic agent, said first starting powder being in the form of at least one powder raw material comprising quartz, orthoclase, albite, anorthite, sericite or corundum, said second starting powder being in the form of at least one mineral composite powder raw material comprising kaolinite, metahalloysite, pyrophyllite, montmorillonite, halloysite or dickite, wherein the first and second starting powders are prepared by drying the second starting powder at a temperature of 120°–400° C. and then uniformly mixing the second starting powder with the first starting powder in a dry condition; and 25–40 wt. % water.

24. The pressure casting slip of claim 23, wherein an average particle diameter of the second starting powder is equal to or less than that of the first starting powder, and wherein at least a portion of the second starting powder is in the form of secondary particles formed by coagulation of primary particles of the second starting powder when dried.

25. The pressure casting slip of claim 23, wherein an average particle diameter of the second starting powder is in a range of 1–5 microns.

26. The pressure casting slip of claim 23, wherein the second starting powder is ground after being dried at 120°–400° C. and is then mixed with the first starting powder in a dry condition.

27. The pressure casting slip of claim 26, wherein the first starting powder is ground in a dry condition before being mixed with the second starting powder.

28. The pressure casting slip of claim 26, wherein the first starting powder and the second starting powder are ground at the same time in a dry condition.

29. The pressure casting slip of claim 26, wherein the first starting powder is ground in a wet condition and dried before being mixed with the second starting powder.

30. A pressure casting slip exhibiting reduced casting time, consisting essentially of:

a first starting powder forming a frame of a mold body and a second starting powder forming a frame of the mold body and acting as a plastic agent, said first starting powder being in the form of at least one powder raw material selected from the group consisting of $Al_2O_3$; $SiO_2$; $Al_2O_3$ and $SiO_2$; $K_2O$, $Al_2O_3$ and $SiO_2$; $Na_2O$, $Al_2O_3$ and $SiO_2$; and $CaO$, $Al_2O_3$ and $SiO_2$, said second starting powder being in the form of at least one powder raw material comprising Gairome clay, kaolin, Kibushi clay or burned clay, wherein the first and second starting powders are prepared by drying the second starting powder at a temperature of 120°–400° C. and then uniformly mixing the second starting powder with the first starting powder in a dry condition; and 25–40 wt. % water.

31. The pressure casting slip of claim 30, wherein an average particle diameter of the second starting powder is equal to or less than that of the first starting powder, and wherein at least a portion of the second starting powder is in the form of secondary particles formed by coagulation of primary particles of the second starting powder when dried.

32. The pressure casting slip of claim 30, wherein an average particle diameter of the second starting powder is in a range of 1–5 microns.

33. The pressure casting slip of claim 30, wherein the second starting powder is ground after being dried at 120°–400° C. and is then mixed with the first starting powder in a dry condition.

34. The pressure casting slip of claim 33, wherein the first starting powder is ground in a dry condition before being mixed with the second starting powder.

35. The pressure casting slip of claim 33, wherein the first starting powder and the second starting powder are ground at the same time in a dry condition.

36. The pressure casting slip of claim 33, wherein the first starting powder is ground in a wet condition and dried before being mixed with the second starting powder.

37. A pressure casting slip exhibiting reduced casting time, consisting essentially of:

a first starting powder forming a frame of a mold body and a second starting powder forming a frame of the mold body and acting as a plastic agent, said first starting powder being in the form of at least one powder raw material selected from the group consisting of $Al_2O_3$; $SiO_2$; $Al_2O_3$ and $SiO_2$; $K_2O$, $Al_2O_3$ and $SiO_2$; $Na_2O$, $Al_2O_3$ and $SiO_2$; and $CaO$, $Al_2O_3$ and $SiO_2$, said second starting powder being in the form of at least one mineral composite powder raw material comprising kaolinite, metahalloysite, pyrophyllite, montmorillonite, halloysite or dickite, wherein the first and second starting powders are prepared by drying the second starting powder at a temperature of 120°–400° C. and then uniformly mixing the second starting powder with the first starting powder in a dry condition; and 25–40 wt. % water.

38. The pressure casting slip of claim 37, wherein an average particle diameter of the second starting powder is equal to or less than that of the first starting powder, and wherein at least a portion of the second starting powder is in the form of secondary particles formed by coagulation of primary particles of the second starting powder when dried.

39. The pressure casting slip of claim 37, wherein an average particle diameter of the second starting powder is in a range of 1–5 microns.

40. The pressure casting slip of claim 37, wherein the second starting powder is ground after being dried at 120°–400° C. and is then mixed with the first starting powder in a dry condition.

41. The pressure casting slip of claim 40, wherein the first starting powder is ground in a dry condition before being mixed with the second starting powder.

42. The pressure casting slip of claim 40, wherein the first starting powder and the second starting powder are ground at the same time in a dry condition.

43. The pressure casting slip of claim 40, wherein the first starting powder is ground in a wet condition and dried before being mixed with the second starting powder.

* * * * *